United States Patent [19]
Ganzel

[11] Patent Number: 5,597,180
[45] Date of Patent: Jan. 28, 1997

[54] VEHICLE ROLL CONTROL APPARATUS

[76] Inventor: Blaise J. Ganzel, 3317 Alton Ct., Ann Arbor, Mich. 48105

[21] Appl. No.: 290,581

[22] Filed: Aug. 15, 1994

[51] Int. Cl.$^6$ .................................................. B60G 21/06
[52] U.S. Cl. ........................................ 280/772; 280/714
[58] Field of Search ................................ 280/772, 689, 280/714, 702, 709, 707

[56] References Cited

U.S. PATENT DOCUMENTS

| | | |
|---|---|---|
| 3,752,497 | 8/1973 | Enke et al. . |
| 3,820,812 | 6/1974 | Stubbs et al. . |
| 3,868,910 | 3/1975 | Schultz . |
| 3,868,911 | 3/1975 | Schultz . |
| 3,871,635 | 3/1975 | Unruh et al. . |
| 3,885,809 | 5/1975 | Pitcher . |
| 3,953,040 | 4/1976 | Unruh et al. . |
| 4,206,935 | 6/1980 | Sheppard et al. . |
| 4,345,661 | 8/1982 | Nishikawa . |
| 4,589,678 | 5/1986 | Lund . |
| 4,624,476 | 11/1986 | Tanaka et al. . |
| 4,669,749 | 6/1987 | Tanaka et al. . |
| 4,693,493 | 9/1987 | Ikemoto et al. . |
| 4,697,237 | 9/1987 | Tanaka et al. . |
| 4,730,843 | 3/1988 | Tanaka et al. . |
| 4,765,649 | 8/1988 | Ikemoto et al. . |
| 4,903,982 | 2/1990 | Harara et al. . |
| 4,937,748 | 6/1990 | Yonekawa et al. . |
| 4,966,390 | 10/1990 | Lund et al. . |
| 5,015,009 | 5/1991 | Ohyama et al. ........................ 280/772 |
| 5,020,826 | 6/1991 | Stecklein et al. . |
| 5,040,823 | 8/1991 | Lund . |
| 5,106,120 | 4/1992 | Di Maria . |
| 5,161,822 | 11/1992 | Lund ................................ 280/710 X |
| 5,177,681 | 1/1993 | Sato . |
| 5,178,406 | 1/1993 | Reynolds . |
| 5,195,772 | 3/1993 | Bachrach et al. .................. 280/714 X |
| 5,219,181 | 6/1993 | Lund . |
| 5,230,529 | 7/1993 | Harvey-Bailey . |
| 5,251,134 | 10/1993 | Takehara et al. . |
| 5,251,136 | 10/1993 | Fukuyama et al. . |
| 5,253,174 | 10/1993 | Inagaki et al. . |
| 5,362,094 | 11/1994 | Jensen ................................. 280/772 X |
| 5,443,283 | 8/1995 | Hawkins et al. .................... 280/714 X |
| 5,447,332 | 9/1995 | Heyring ................................. 280/772 |

OTHER PUBLICATIONS

"Sachs ADC and ARS Systems," Vehicle News No. 198 (Oct. 1992).
"On–Road/Off–Road: Isuzu's Switchable Stabilizer," Automobile Magazine (Mar. 1994).

Primary Examiner—Lee W. Young
Attorney, Agent, or Firm—Brooks & Kushman P.C.

[57] ABSTRACT

An apparatus is disclosed for controlling the roll of a motor vehicle. The apparatus comprises an anti-roll bar, a hydraulic circuit, an actuator, and a pair of valves. The hydraulic circuit includes a pump and a power steering rack disposed downstream from the pump. The actuator is coupled between the anti-roll bar and an unsprung portion of the vehicle. In one embodiment of the invention, the actuator comprises a piston having a wrist pin rotatable therein and engaged with the anti-roll bar, the piston being reciprocable against a force to counteract the twisting of the anti-roll bar. The first valve is situated in the hydraulic circuit upstream of the power steering rack and selectively establishes a pressure differential thereacross. Preferably, the first valve comprises a housing having an inlet and an outlet, a spool disposed at least partially in the housing and axially movable therein, and a poppet floatingly mounted on an end of the spool proximate the housing inlet and axially movable with the spool. The second, directional valve has first and second positions, the first position putting a first port of the actuator in communication with an upstream side of the first valve and a second port of the actuator in communication with an downstream side of the first valve. In the second position, the directional valve puts the first port in communication with the downstream side of the first valve and the second port in communication with the upstream side of the first valve.

20 Claims, 5 Drawing Sheets

5,597,180

VEHICLE ROLL CONTROL APPARATUS

TECHNICAL FIELD

This invention relates to motor vehicle roll control systems.

BACKGROUND ART

Suspension systems for motor vehicles are known which isolate the vehicle load from irregularities in the terrain over which the vehicle travels. A passive suspension system, for example, normally includes a spring and a damper connected between the sprung and unsprung portions of the vehicle. Passive suspension systems are generally self-contained, and only react to the loads applied to them. In active suspension systems, by contrast, the reactions to the applied loads are positively supplied by electronically controlled hydraulic or pneumatic actuators.

In addition to isolating the sprung portion of the vehicle from the road, it is desirable to stabilize the tendency of the sprung portion of the vehicle to tilt or roll relative to its unsprung portion when accelerating, decelerating or cornering at relatively high rates. Therefore, suspension systems have been proposed that attempt to maintain the vehicle in an essentially level position, regardless of the source of the force seeking to upset that position. For example, U.S. Pat. No. 5,161,822 to Lund discloses a tilt correction system with at least one pair of hydraulic cylinder and piston assemblies which are preferably connected between an anti-roll bar and an axle.

SUMMARY OF THE INVENTION

The present invention is an apparatus for controlling the roll of a motor vehicle. The apparatus comprises a hydraulic circuit, an actuator, and a pair of valves. The hydraulic circuit includes a power steering pump, while the actuator is connected between a sprung portion of the vehicle and an unsprung portion of the vehicle. In one embodiment of the invention, the actuator comprises a piston having a wrist pin rotatable therein, the piston being reciprocable against a force to counteract the twisting of an anti-roll bar.

The first valve is situated in the hydraulic circuit downstream of the power steering pump and is adapted to selectively establish a pressure differential thereacross. Preferably, the first valve comprises a housing having an inlet and an outlet, a spool disposed at least partially in the housing and axially movable therein, and a poppet floatingly mounted on an end of the spool proximate the housing inlet and axially movable with the spool.

The second, directional valve has first and second positions, the first position putting a first port of the actuator in communication with an upstream side of the first valve and a second port of the actuator in communication with an downstream side of the first valve. In the second position, the directional valve puts the first port in communication with the downstream side of the first valve and the second port in communication with the upstream side of the first valve.

Accordingly, it is an object of the present invention to provide an apparatus of the type described above in which a two-position valve for directing the flow of hydraulic fluid to roll control actuators is situated in a hydraulic circuit upstream of a power steering rack.

Another object of the present invention is to provide an electronically controlled high pressure differential valve for the roll control system disclosed herein.

Another object of the present invention is to provide a rotary actuator for the roll control system disclosed herein.

These and other objects, features, and advantages of the present invention are readily apparent from the following detailed description of the best mode for carrying out the invention when taken in conjunction with the accompanying drawings.

BEST MODE FOR CARRYING OUT THE INVENTION

Figure 1:
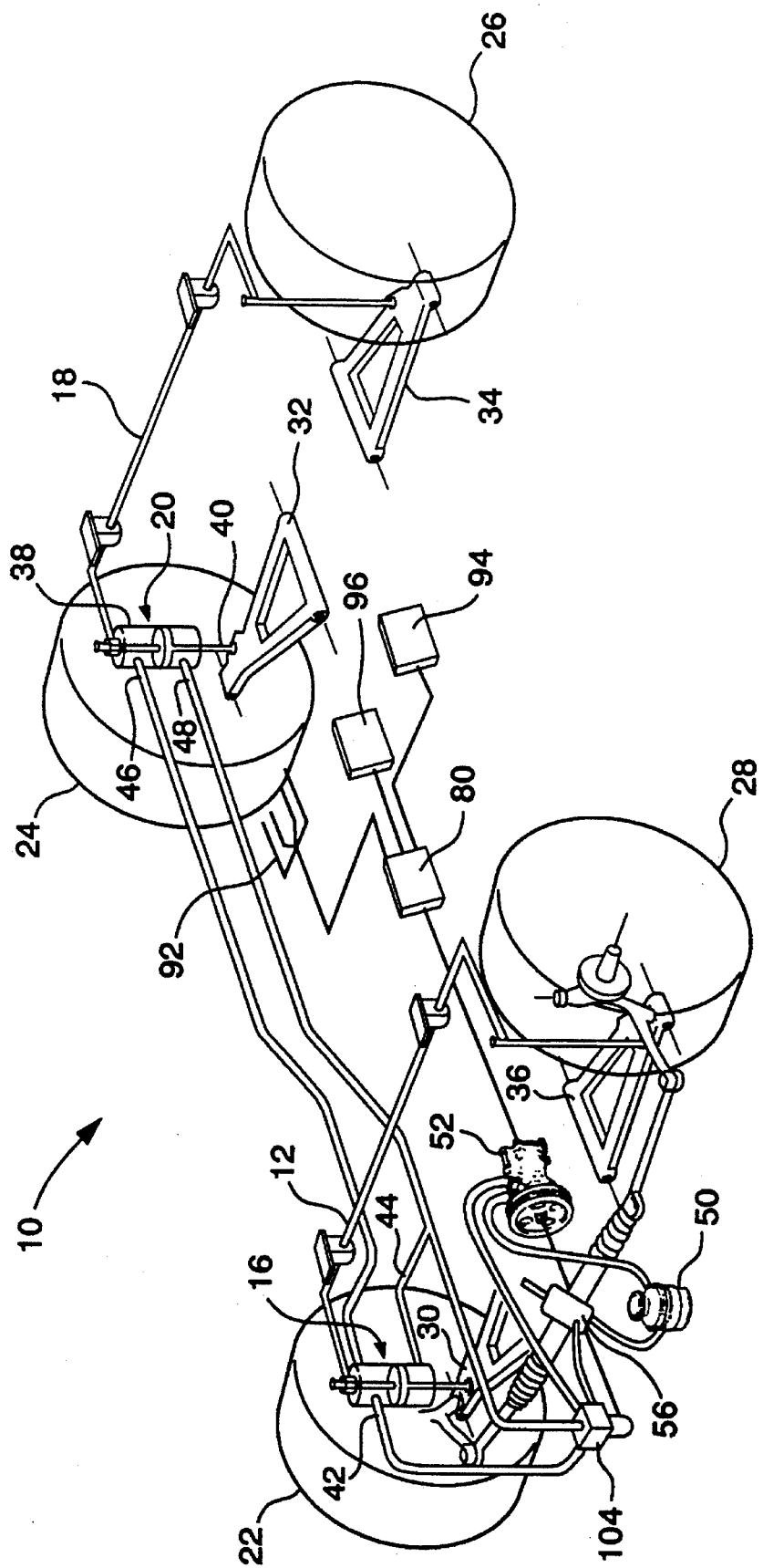
FIG. 1 is a schematic view of an apparatus according to the present invention for controlling the roll of a motor vehicle.
Figure 2:
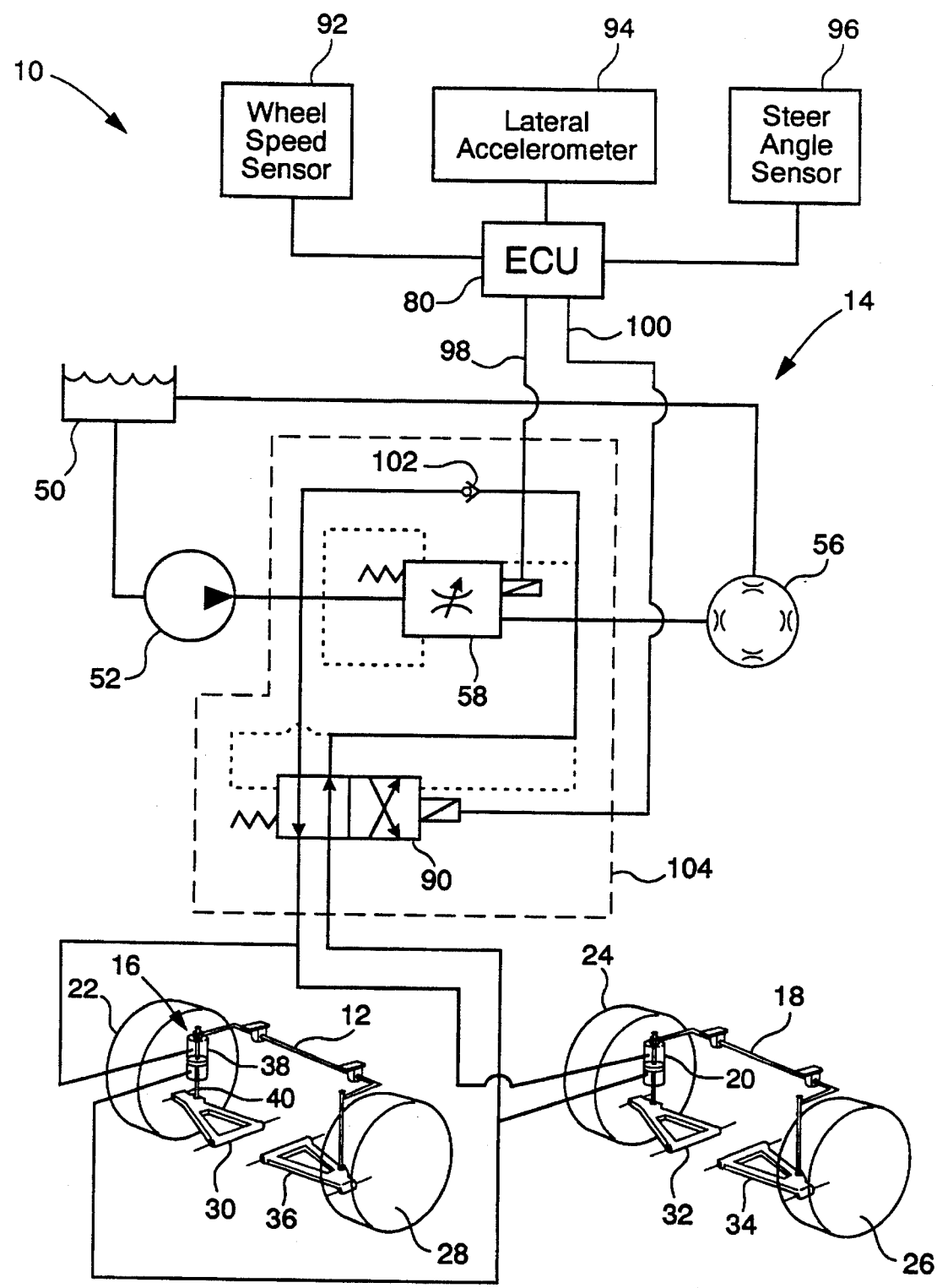
FIG. 2 is another schematic view of the roll control apparatus shown in FIG. 1.

With reference to the drawings, the preferred embodiments of the present invention will be described. FIGS. 1 and 2 show an apparatus 10 according to the present invention for controlling the roll of a motor vehicle. The apparatus 10 comprises at least one anti-roll or anti-sway bar 12, a hydraulic circuit 14, and an actuator 16. In the embodiment shown in FIGS. 1 and 2, a second, rear anti-roll bar 18 and rear actuator 20 are also provided.

Each of the wheels 22, 24, 26 and 28 of the vehicle is rotationally mounted about a substantially horizontal axis to a member such as suspension arms 30, 32, 34 and 36, respectively, which form part of an unsprung portion of the vehicle. The unsprung portion of the vehicle is in turn connected to a sprung portion of the vehicle through the actuators 16 and 20 and the anti-roll bars 12 and 18. Each of the actuators 16 and 20 is pressure balanced and includes a cylinder 38 and a double ended piston 40 reciprocably disposed in the cylinder.

One of the cylinder 38 or piston 40 of each actuator is drivingly connected to one of the anti-roll bar or suspension arm, while the other of the cylinder/piston pair is drivingly connected to the other of the anti-roll bar or suspension arm. In the embodiment shown in FIGS. 1 and 2, for example, the cylinder 38 of the front actuator 16 is connected to one free end of the front anti-roll bar 12, while the portion of the piston rod extending generally downwardly from the cylinder is connected to the front right suspension arm 30. Similarly, the rear anti-roll bar 18 is coupled to the cylinder of the right rear actuator 20 while the piston 40 of the actuator 20 is connected to the suspension arm 32.

The actuators 16 and 20 each have a pair of ports, respectively 42, 44 and 46, 48, through which a working medium such as hydraulic fluid may be alternately provided to or evacuated from the ends of the cylinders 38 disposed on either side of the pistons 40 situated therein. As described more fully below, each of the actuators 16 and 20 serves to maintain the sprung height from the road surface of the portion of the vehicle body above its associated wheel by pressurization of the hydraulic fluid in the pressure chambers of the cylinders.

The hydraulic circuit 14 includes a conventional tank or reservoir 50 and a pump 52. The pump may be either a dedicated pump, or preferrably the power steering pump of the motor vehicle. The pump 52 draws hydraulic power steering fluid from the tank 50, and circulates the fluid through the hydraulic circuit 14 and a power steering rack 56 disposed downstream from the pump. It should be appreciated that other steering arrangements, such as a screw and nut mechanism, may exist in place of the power steering rack.

Figure 3:
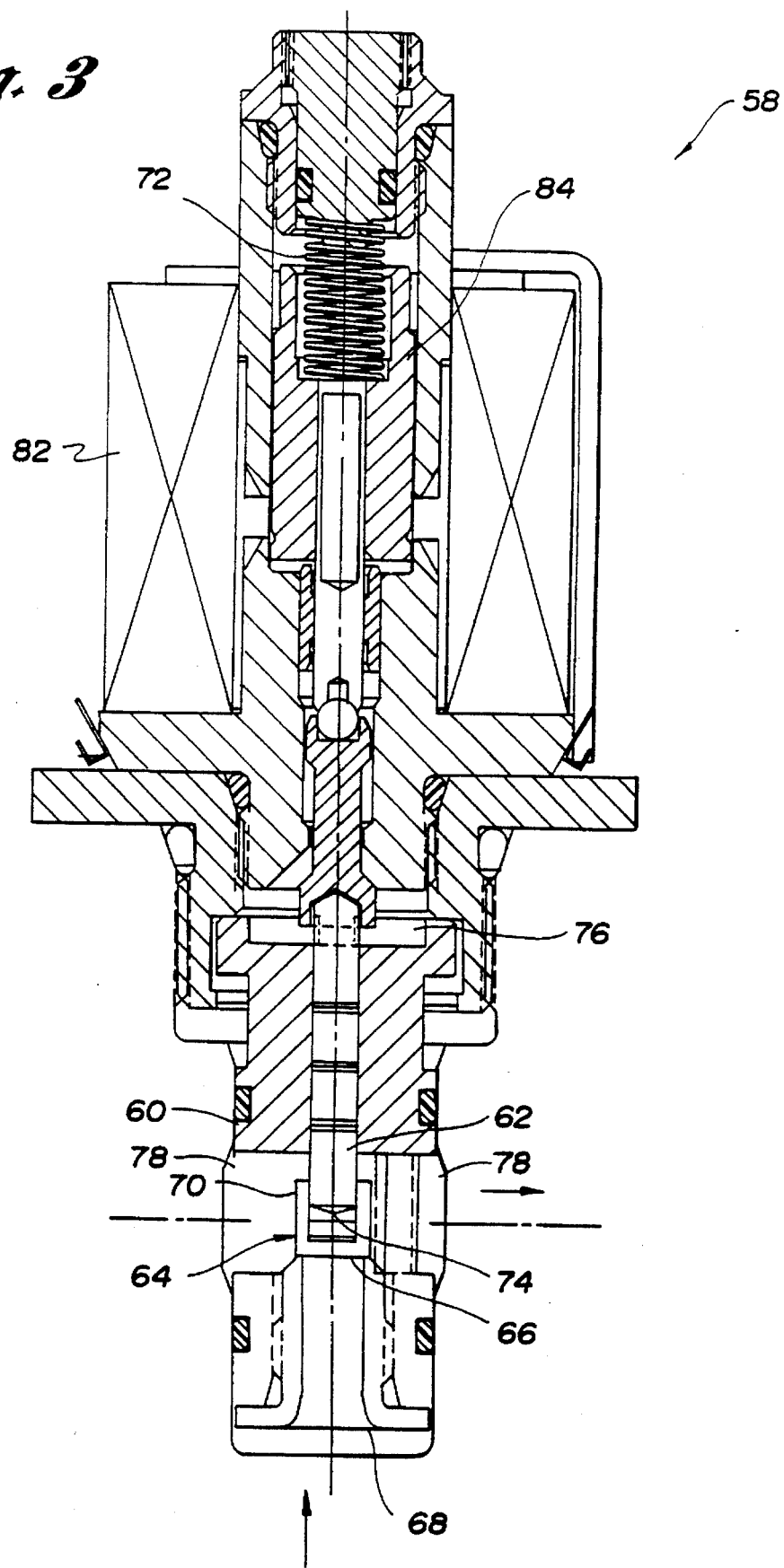
FIG. 3 is a cross-sectional view of a high pressure differential valve for the roll control apparatus.

A high pressure differential valve 58, one embodiment of which is shown in detail in FIG. 3, is situated in the hydraulic circuit 14 downstream of the pump 52 and upstream of the power steering rack 56. The valve 58 includes a housing 60, a segmented spool or valve stem 62 disposed at least partially in the housing, and a poppet 64. The poppet 64 includes a face portion 66 generally opposed to a chamfered, generally circular valve seat surrounding an inlet 68 of the housing, and a wall portion 70 extending generally axially from the perimeter of the face portion.

The poppet 64 is floatingly mounted on an end of the spool 62 proximate the housing inlet 68. Preferably, this is accomplished by providing a radial clearance between the outside diameter of the cylindrical spool and the inside diameter of the wall portion 70 of the poppet. Normally, the spool 62 is extended by a spring 72 to close the valve. Upon the introduction of even relatively low fluid flow through the housing inlet 68, the poppet 64 is forced back against the non-planar, preferably generally convex bottom 74 of the spool by the force of the incoming flow. The incoming fluid flow is desirably also fed to a chamber 76 so that the spool 62 is pressure balanced. The outgoing fluid flow then exits the valve through lateral slots 78 along a flow axis situated generally at about 90 degrees to the axis of the inlet 68.

Regardless of the flow rate from the pump 52, the variable orifice valve 58 is adapted to selectively establish and maintain a particular, relatively high pressure differential between the inlet 68 and the outlet 78, as dictated by an electronic control unit (ECU) 80 in response to a variety of inputs discussed below. For this purpose, the spool 62 is solenoid operated, so that upon the direction of current through a winding 82, an armature 84 connected to the spool is drawn axially downwardly with the spool with a force proportional to the magnitude of current applied to the winding.

As long as there is flow through the inlet 68, the poppet 64 is axially movable with the spool 62 to vary a gap between the face portion 66 of the poppet and the perimeter of the housing inlet. In one embodiment of the valve 58, the stroke of the spool 62 is about 1.5–2.0 millimeters (0.059–0.079 inch), and the gap is correspondingly variable down to a minimum of about 0.102–0.127 millimeters (0.004–0.005 inch). Of course, the minimum axial dimension of the wall portion 70 of the poppet is chosen to ensure that the spool 62 cannot be withdrawn so far as to disengage the poppet 64.

Given flow rates of about 2.5 gallons per minute, it has been determined that a pressure differential in the range of about 10 to 800 pounds per square inch (psi) can be established and maintained between the inlet 68 and the outlet 78. For the present application in a vehicle roll control system, it is normally necessary only to establish a pressure drop of about 500 psi across the valve. Furthermore, the valve 58 has a relatively flat force versus gap curve, which results in an insensitivity to pressure differentials with changing flow rates.

Because the poppet 64 is pivotable on the rounded end 72 of the spool, unintended engagement of a part of the face portion 66 with the perimeter of the housing inlet 68 is avoided. Such premature engagement, which might for instance arise due to alignment or tolerance errors, is more likely to occur at smaller gaps. Particularly at these small gaps, a misalignment error may result in an actual pressure drop across the valve different than the intended pressure drop calculated by the ECU 84. The intended pressure drop can be reasonably assured as a function of the position of the spool 62, however, because the face portion 66 of the poppet remains generally normal to the incoming flow.

Referring again to FIGS. 1 and 2, a two-position, pressure balanced spool valve 90 is in communication with the upsteam and downstream sides of the valve 58 for directing hydraulic fluid to the actuators 16 and 20. In its normal operating position shown in FIG. 2, the directional valve 90 puts the upper ports 42 and 46 of the actuators 16 and 20, respectively, in communication with the upstream side of the pressure control valve 58. In this first position, the lower ports 44 and 48 of the actuators are in communication with the downstream side of the valve 58. In its second position schematically designated to the righthand side in FIG. 2, the directional valve 90 puts the upper ports 42 and 46 in communication with the downstream side of the valve 58, and the lower ports 44 and 48 in communication with the upstream side of the valve 58.

In operation, the ECU 80 processes inputs from one or more wheel speed sensors 92, a lateral accelerometer 94, and a steering angle sensor 96. Given these inputs, the ECU predicts the severity of an upcoming roll, and issues control commands to the solenoids of the valves 58 and 90 through communication lines 98 and 100. For example, the motor vehicle may begin a relatively high speed left hand turn, which in absence of compensation by the apparatus 10 would cause the unsprung portion of the vehicle to tend to roll generally clockwise about its longitudinal axis.

At the beginning of such a manuever, sensors 92, 94 and 96 of the present invention signal the instantaeous conditions to the ECU 80. The ECU in turn calculates or obtains from a look up table the net pressure P that needs to be developed in the upper chambers of the cylinders 38 of one or both of the actuators 16 and 20 to counteract the vehicle roll. Because the directional valve 90 is already in the proper position directing fluid from the upstream side of the valve 58 to the upper chambers of the cylinders, the ECU 80 need only command the valve 58 to establish a pressure drop thereacross equal to P.

To counteract anticipated vehicle roll in the opposite direction, for example as might be experienced during a right hand turn, the ECU 80 first energizes the solenoid of the directional valve 90 to shift the valve to its second position so that the lower chamber of both actuator cylinders is in communication with the high pressure side of the valve 58. Thereafter, the ECU simply executes the same procedure outlined above. In either case, as the sensors 92, 94 and 96 indicate an instantaneous or anticipated reduction or increase in the need for counteracting vehicle roll, the ECU signals the valve 58 to correspondingly reduce or increase the pressure drop thereacross, thereby correspondingly altering the net pressure developed on the pistons 40 in the cylinders 38 of the actuators.

A check valve 102 is also preferably provided in the hydraulic circuit 14 in communication between the upsteam and downstream sides of the proportional pressure control valve 58. The check valve 102 permits the flow of fluid only from the downstream side of the valve 58 to the upstream side of the valve, to prevent back flow through the valve 58 if a sudden suspension deflection creates a flow in the system greater than the output flow of the pump 52. The valves 58, 90 and 102 are advantageously packaged as a unit 104.

Figure 4:
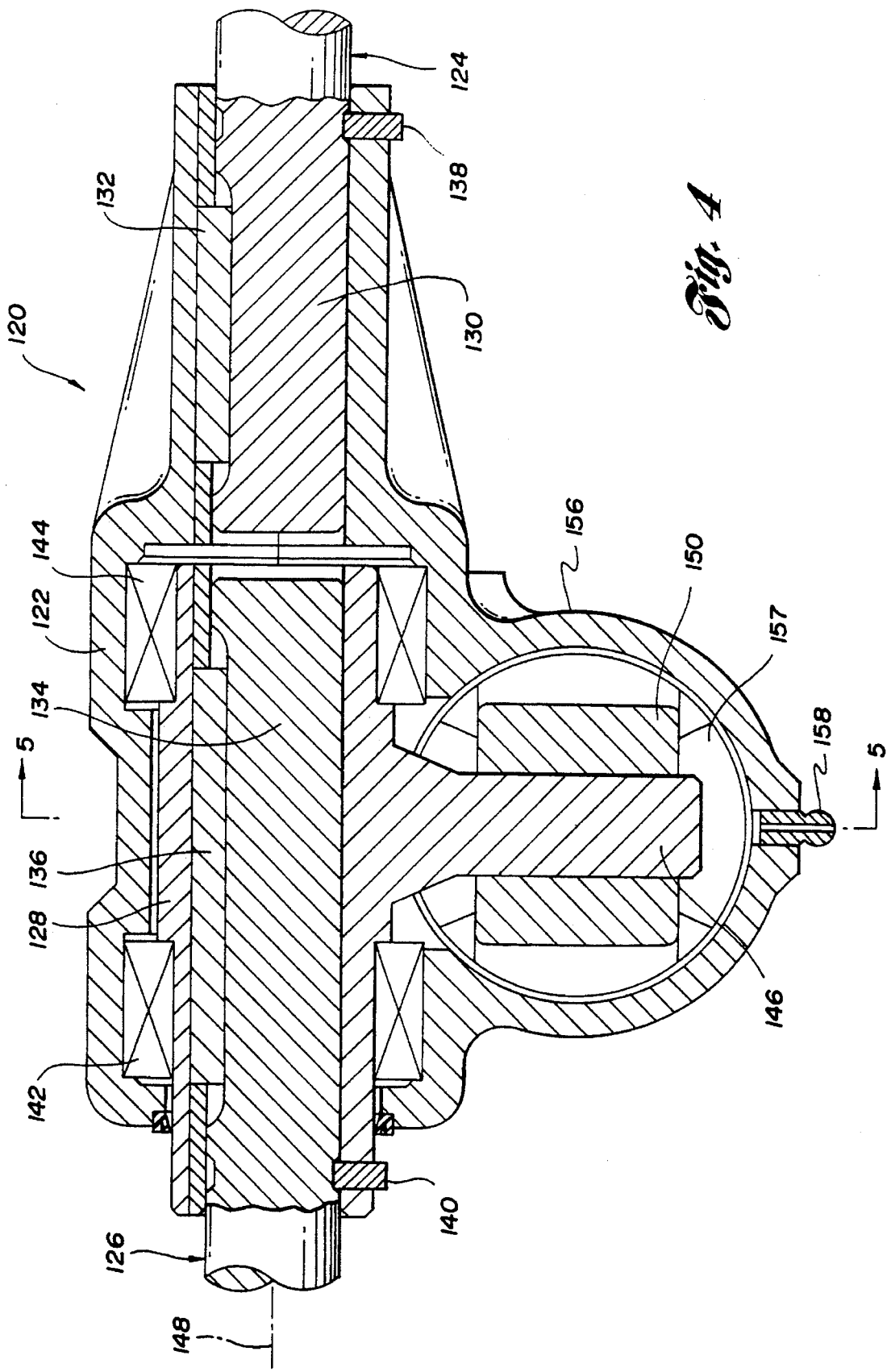
FIG. 4 is a cross-sectional view of a rotary roll control actuator for the roll control apparatus.
Figure 5:
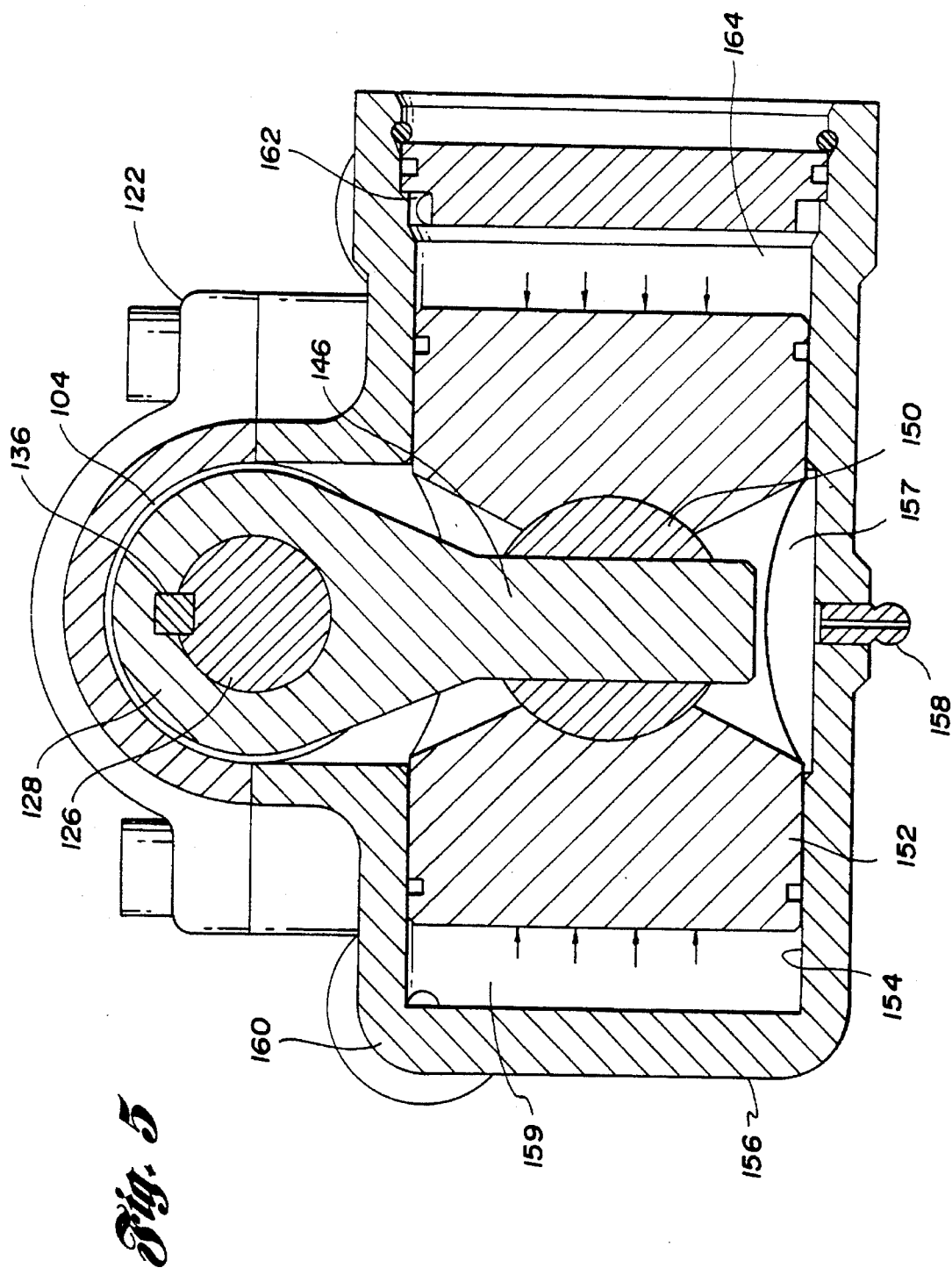
FIG. 5 is a cross-sectional view of the rotary roll control actuator taken along line 5—5 in FIG. 4.

FIGS. 4 and 5 show a rotary roll control actuator 120 for the roll control apparatus 10 which can be used in place of either or both of the hydraulic linear actuators 16 and 20 shown in FIGS. 1 and 2 above. The rotary actuator 120 comprises a housing 122, first and second anti-roll bars 124 and 126, respectively, and a T-bar member 128.

The first anti-roll bar 124 has an end 130 non-rotatably connected to the housing 122, such as by splines or a key 132 which fits into a corresponding keyway in the housing. The second anti-roll bar 126 has an end 134 similarly non-rotatably connected to the T-bar member 128 by a key 136. Set screws 138 and 140 are provided extending respectively through portions of the housing 122 and the T-bar member 128 and into engagement with slots or grooves in the ends of the corresponding anti-roll bars 124 and 126 to generally fix the anti-roll bars against significant relative axial movement. Of course, a more permanent method of attaching the ends 130 and 134 of the anti-roll bars to the housing and the T-bar member can also be used. Preferably, the ends 130 and 134 of the anti-roll bars are simply the product of splitting either of the anti-roll bars 12 or 18 shown in FIGS. 1 and 2 and described above.

The T-bar member 128 is rotatably mounted in the housing 122 such as by roller bearings 142 and 144. An integral leg 146 of the T-bar member extends outwardly from the longitudinal axis 148 defined by the ends 130 and 134 of the anti-roll bars, and slidably engages a wrist pin 150. The wrist pin, in turn, is rotatably disposed in a double-ended piston 152 reciprocable in a cylinder 154 formed in a lower portion 156 of the housing 122. A wrist pin/T-bar cavity 157 may be packed with grease through a lubrication fitting 158 to lubricate the interfaces of the leg 146, wrist pin 150 and piston 152.

The piston 152 is reciprocable along an axis askew, i.e. spaced apart and optimally perpendicular, to the axis 148 of the anti-roll bars 124 and 126. The leg 146 of the T-bar member 128 cooperates with the wrist pin 150 to convey torsion of the second anti-roll bar 126 into reciprocation of the piston. To develop a force tending to counteract the twisting of the anti-roll bar 126 in the clockwise direction as seen in FIG. 5, fluid from a hydraulic circuit such as the one described above may be introduced into a cavity or chamber 159 of the cylinder 154 through a port 160 to increase the pressure in the chamber 159 resisting travel of the piston in the leftward direction as shown in FIG. 5. To facilitate this process, fluid may be contemporaneously evacuated through a port 162 from a chamber 164 to decrease the pressure against the side of the piston 152 closer to the port 162.

To counteract twisting of the anti-roll bar 126 in the counterclockwise direction as seen in FIG. 5, fluid pressure is increased in the chamber 164 and decreased in the chamber 159, as may be accomplished when the directional valve 90 is in the righthand position shown in FIG. 2. Any reactional movement of the housing 122 to twisting of the anti-roll bar 126 in either direction is translated to and borne by the opposite anti-roll bar 124.

Similarly, twisting of the anti-roll bar 124 is translated to the housing 122, which in turn increases the fluid pressure in one of the chambers 159 or 164 and tends to move the piston 152. To counteract the rotational movement of the housing, the roll control system increases fluid pressure in one of the chambers and/or decreases pressure in the opposite chamber. For example, upon the initiation of rotation of the housing 122 in the clockwise direction as seen in FIG. 5, the piston 152 experiences a force tending to move the piston towards the left. To inhibit rotation of the housing 122 to whatever degree is desired, fluid pressure in the chamber 159 is decreased, and/or pressure in the chamber 164 is increased. The resulting travel of the piston 152 to the left is then translated to and borne by the anti-roll bar 126.

The configuration of the pressured balanced actuator 120, with piston travel perpendicular to the axes of the anti-roll bars 124 and 126, allows for the use of relatively low cost bearings and seals. Furthermore, the actuator 120 may be packaged on vehicles where there is no room for conventional hydraulic cylinders. In particular, the actuator 120 may be positioned anywhere along the axial extent of the front or rear anti-roll bar, such as may be necessary where there is insufficient space at the end of the anti-roll bar. In one embodiment of the actuator 120, the T-bar member 128 is capable of sweeping through a maximum rotational angle of about 25.6 degrees, although of course provision can be made for increasing or decreasing this tolerance.

Positioning the roll control system of the present invention upstream of the power steering rack allows for relatively high pressures to be used without the likelihood of exceeding the capabilities of the seals in the power steering system. Furthermore, the use of pressure balanced roll control actuators, required due to this positioning in the power steering system, allows for a hydraulic circuit with a two position pressure balanced spool, while the higher available pressures allow for downsizing of the roll control actuator. Finally, only a single proportional pressure control valve is required for the entire system.

It should be understood that while the forms of the invention shown and described above constitute preferred embodiments of the invention, they are not intended to illustrate all possible forms thereof. It should also be understood that the words used are words of description rather than limitation, and various changes may be made without departing from the spirit and scope of the invention disclosed.

I claim:

1. An apparatus for controlling the roll of a motor vehicle, the apparatus comprising:

a hydraulic circuit including a power steering pump;

an actuator connected between a sprung portion of the vehicle and an unsprung portion of the vehicle, the actuator having first and second ports;

a first valve situated in the hydraulic circuit downstream of the power steering pump and adapted to selectively establish a pressure differential thereacross; and a directional valve having first and second positions, the first position putting the first port of the actuator in communication with a first side of the first valve and the second port of the actuator in communication with a second side of the first valve, and the second position putting the first port in communication with the second side of the first valve and the second port in communication with the first side of the first valve.

2. The apparatus of claim 1 further comprising a check valve in communication between the first and second sides of the first valve.

3. The apparatus of claim 2 wherein the check valve permits flow only from the second side of the first valve to the first side of the first valve.

4. The apparatus of claim 1 wherein the actuator is connected between an anti-roll bar of the vehicle and the unsprung portion of the vehicle.

5. The apparatus of claim 1 further comprising a power steering rack disposed downstream from the power steering pump.

6. The apparatus of claim 5 wherein the first valve is situated in the hydraulic circuit upstream of the power steering rack.

7. The apparatus of claim 1 wherein the actuator comprises a rotary actuator.

8. The apparatus of claim 1 wherein the actuator comprises a hydraulic cylinder.

9. The apparatus of claim 1 wherein the directional valve comprises a spool valve.

10. The apparatus of claim 1 wherein the directional valve is pressure balanced.

11. The apparatus of claim 1 wherein the first valve comprises a housing having an inlet and an outlet, a spool disposed at least partially in the housing and axially movable therein, and a poppet floatingly mounted on an end of the spool proximate the housing inlet and axially movable with the spool.

12. An apparatus for controlling the roll of a motor vehicle, the apparatus comprising:

a hydraulic circuit including a pump;

an actuator connected between a sprung portion of the vehicle and an unsprung portion of the vehicle, the actuator having first and second ports;

a first valve situated in the hydraulic circuit downstream of the pump and adapted to selectively establish a pressure differential thereacross; and a directional valve having first and second positions, the first position putting the first port of the actuator in communication with a first side of the first valve and the second port of the actuator in communication with a second side of the first valve, and the second position putting the first port in communication with the second side of the first valve and the second port in communication with the first side of the first valve.

13. The apparatus of claim 12 further comprising a check valve in communication between the first and second sides of the first valve.

14. The apparatus of claim 13 wherein the check valve permits flow only from the second side of the first valve to the first side of the first valve.

15. The apparatus of claim 12 wherein the actuator is connected between an anti-roll bar of the vehicle and the unsprung portion of the vehicle.

16. The apparatus of claim 12 wherein the actuator comprises a rotary actuator.

17. The apparatus of claim 12 wherein the actuator comprises a hydraulic cylinder.

18. The apparatus of claim 12 wherein the directional valve comprises a spool valve.

19. The apparatus of claim 12 wherein the directional valve is pressure balanced.

20. The apparatus of claim 12 wherein the first valve comprises a housing having an inlet and an outlet, a spool disposed at least partially in the housing and axially movable therein, and a poppet floatingly mounted on an end of the spool proximate the housing inlet and axially movable with the spool.

* * * * *